C. Dixon.
Seat.

No. 81,150 — Patented Aug. 18, 1868

Witnesses

Inventor
Ch' Dixon
Attorney

United States Patent Office.

CHARLES DIXON, OF WEEDSPORT, NEW YORK.

Letters Patent No. 81,150, dated August 18, 1868.

IMPROVED FASTENER FOR VEHICLE-SEATS.

*The Schedule referred to in these Letters Patent and making part of the same.*

TO ALL WHOM IT MAY CONCERN:

Be it known that I, CHARLES DIXON, of Weedsport, in the county of Cayuga, and State of New York, have invented a new and useful Improvement in Fasteners for Vehicle-Seats; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved fastener, by means of which the seats of wagons, sleighs, and other vehicles, may be conveniently, securely, and detachably secured in place.

It consists in the construction and combination of the various parts of the fastener, as hereinafter more fully described.

A represents an ordinary wagon-box.

B represents a seat, the supports, $b'$, of which rest upon cleats or bars $a'$, attached to the inner sides of the side-boards of the box A.

C are two ears, attached to the inner sides of each of the supports $b'$ of the seat, and in which are formed bearings for the journals of the eccentric or cam-shaft D.

E is a lever, formed upon or attached to the cam-shaft D, and by means of which the said cam or eccentric-shaft is operated.

Figure 1:
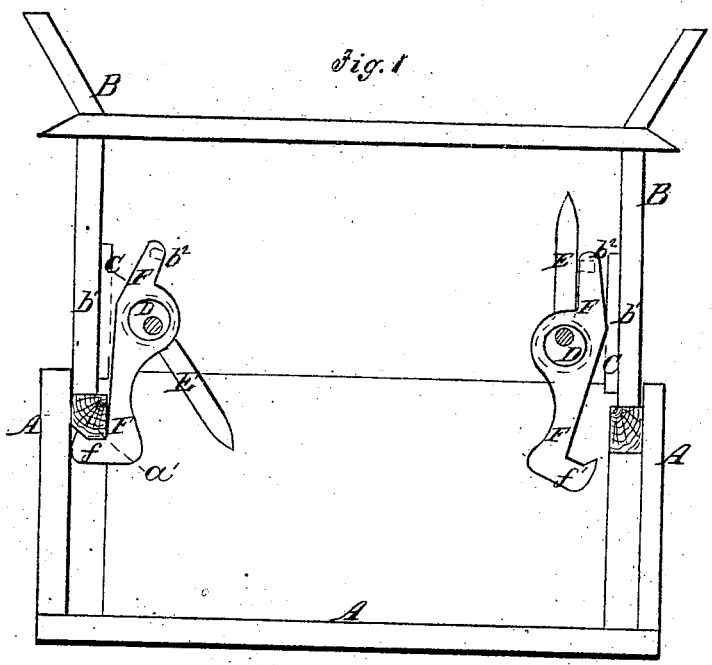
Figure 1 is a vertical section of my improved seat-fastener, taken through the line $x$ $x$, fig. 2, showing it as attached to a wagon-seat and box.
Figure 2:
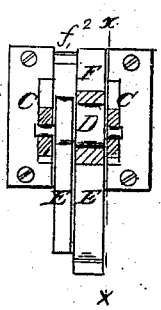
Figure 2 is a detail view of the same, parts being broken away to show the construction.

F is a lever, having a hole formed through its middle part, of such a size as to fit upon the cam or eccentric, D, as shown in figs. 1 and 2.

Upon the lower end of the lever F is formed a hook, $f^1$, having an upwardly-projecting point, as shown in fig. 1. The upper end of the lever F projects a little above the eccentric, D, and has a projection, $f^2$, formed upon that side which is toward the lever E, as shown in fig. 2, and in dotted lines in fig. 1.

In using the fastener, its parts are brought into the position shown at the right hand in fig. 1. The seat B is then adjusted in place, and the lever E is moved downward, the effect of which is to move the lower end of the hook-lever F outward and upward, so as to clamp the bar or cleat $a'$ of the box A, as shown at the left hand, in fig. 1, securely fastening the seat in place.

In unfastening the seat, the lever E is moved upward, which lowers the hook $f^1$ of the hook-lever F from the cleat $a'$, and as the lever E strikes the projection $f^2$ of the lever-hook F, the lower or hooked end of said lever F is swung outward, so that the seat B may be conveniently removed or adjusted.

Having thus described my invention, I claim as new, and desire to secure by Letters Patent—

The cam or eccentric, D, lever E, lever-hook F, and ears C, constructed and combined with each other, substantially as herein shown and described, and for the purpose set forth.

The above specification of my invention signed by me, this 29th day of May, 1868.

CHARLES DIXON.

Witnesses:
ALEX. F. ROBERTS,
JAMES T. GRAHAM.